March 19, 1946.   S. KANTER   2,396,660
PILOT TRAINING APPARATUS
Filed July 8, 1942   4 Sheets-Sheet 1
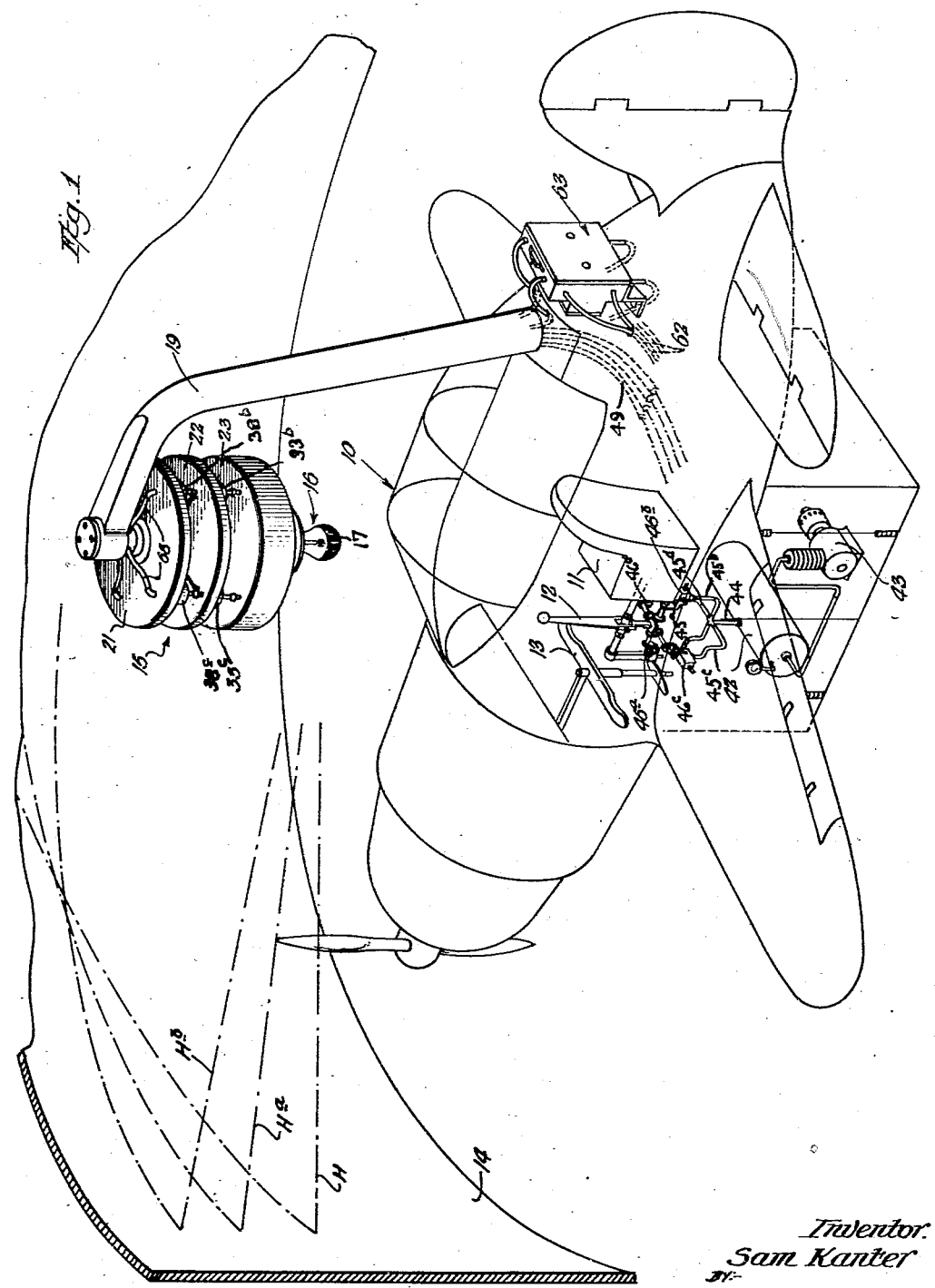
Inventor:
Sam Kanter March 19, 1946. S. KANTER 2,396,660
PILOT TRAINING APPARATUS
Filed July 8, 1942 4 Sheets-Sheet 2
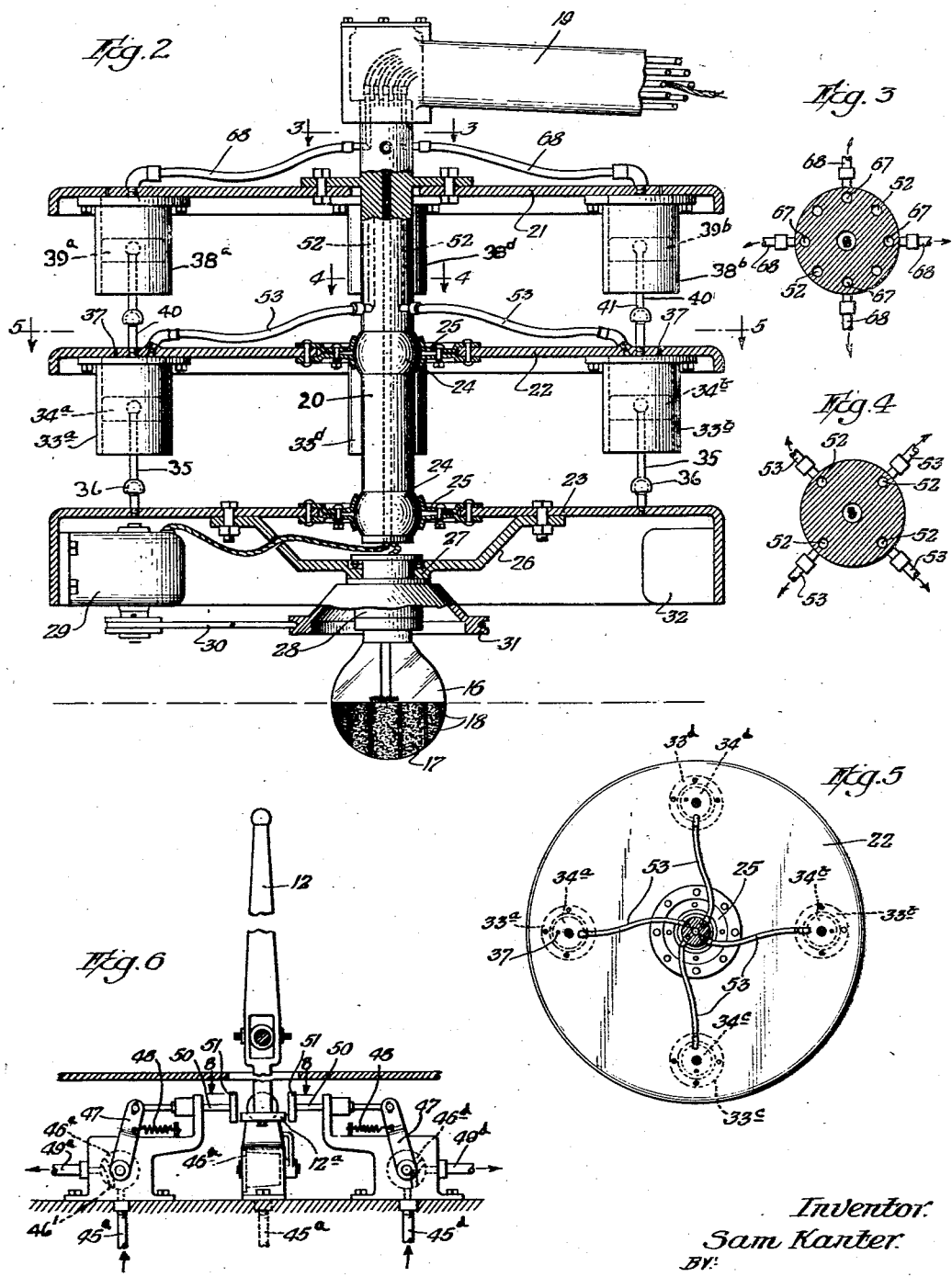

March 19, 1946.            S. KANTER                    2,396,660
                    PILOT TRAINING APPARATUS
              Filed July 8, 1942          4 Sheets-Sheet 3
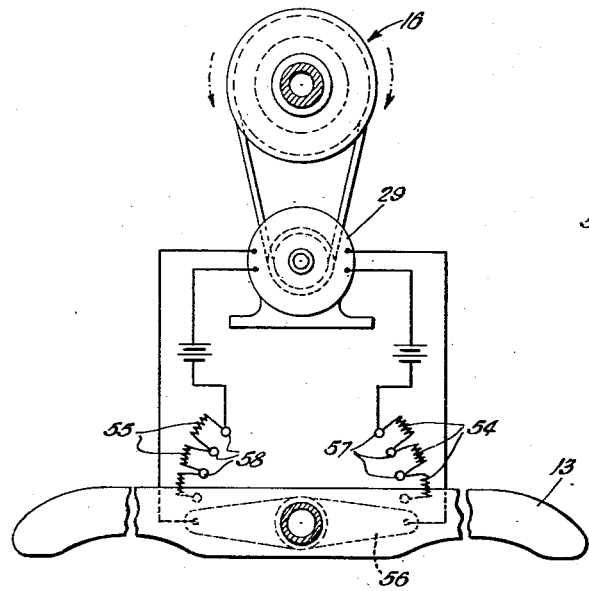
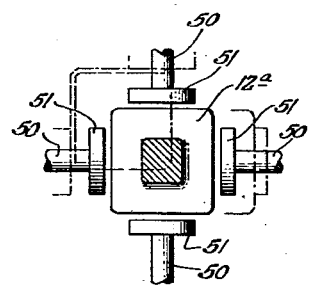
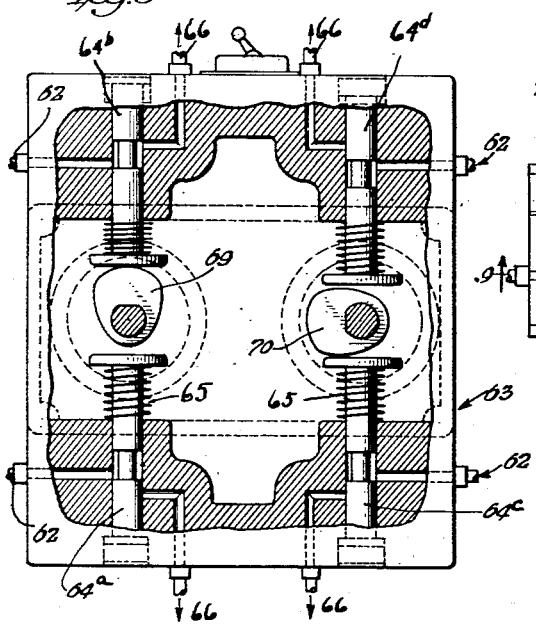
Inventor.
Sam Kanter.
By
Attys.

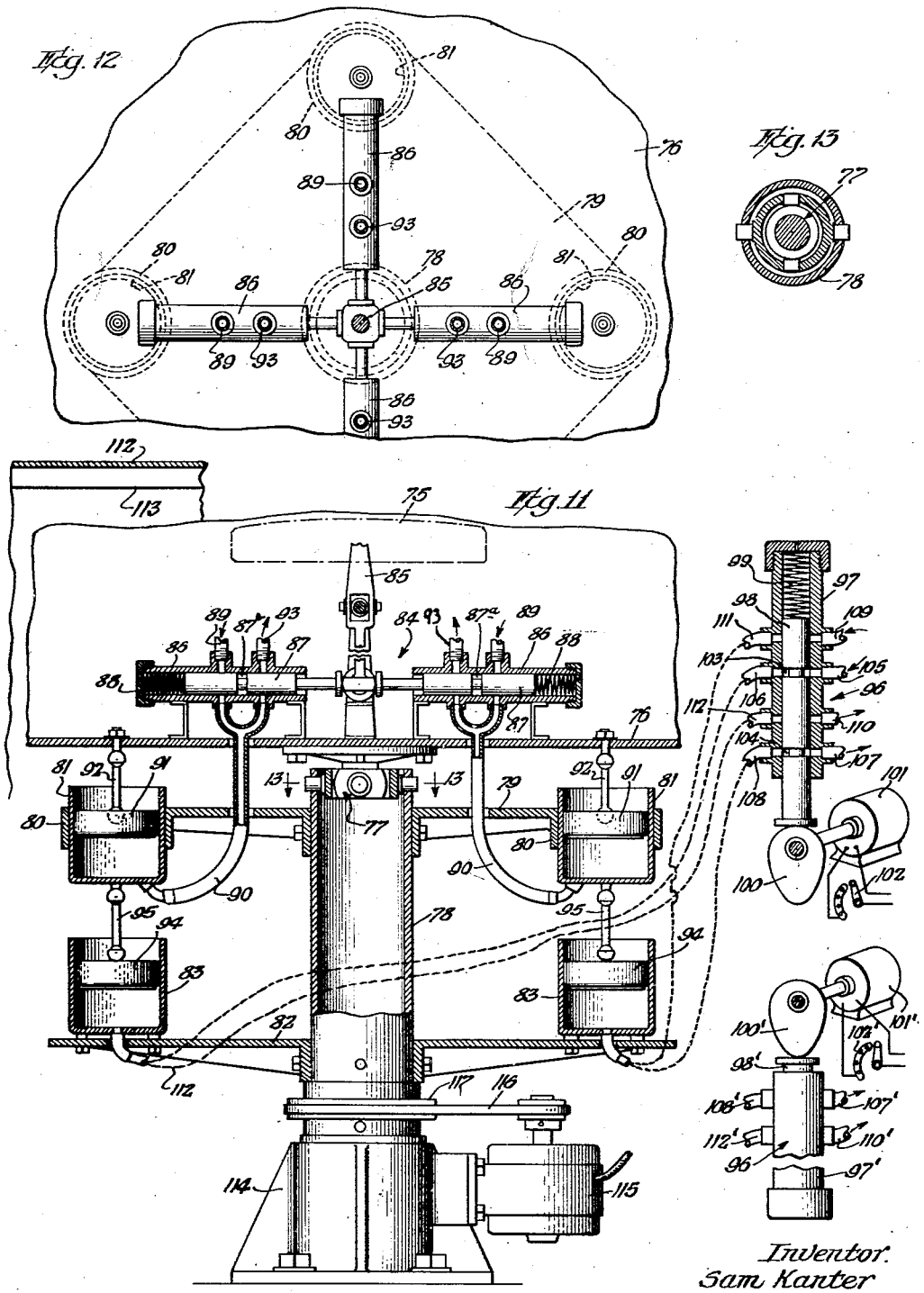

Patented Mar. 19, 1946

2,396,660

UNITED STATES PATENT OFFICE 2,396,660

PILOT TRAINING APPARATUS

Sam Kanter, Chicago, Ill.

Application July 8, 1942, Serial No. 450,115

6 Claims. (Cl. 35—12)

This invention relates to improvements in pilot training apparatus.

In the initial training of airplane pilots it is considered desirable to acquaint them not only with the proper mode of manipulating the controls of a plane but to enable them to visualize the results of such manipulations, that is, the effects of such manipulations upon the performance of a plane in actual flight.

Apparatus has heretofore been proposed for giving initial training to prospective pilots but the present improvements are calculated not only to enable a trainee and, optionally an instructor, to observe the result of the manipulation of conventional plane controls as in actual flight but to enable an instructor to set up in the apparatus varying conditions simulating conditions of actual flight and to observe the reactions of the trainee to such varying conditions and to give practice to the trainee in controlling a plane.

An object of the present invention is to provide improved training apparatus having means for effecting simulation of varying flight conditions and control means operable by a trainee for correctional operation of the apparatus in simulation of the guidance of a plane flying under such conditions.

An additional object of the invention is to provide training apparatus having means for establishing simulated varying flight conditions beyond the control of a trainee but, optionally, under the control of an instructor whereby the reactions of the trainee to such varying conditions can be observed and, if desired, particular conditions can be repeated for purposes of correctional practice by the trainee.

An additional object of the invention is to provide apparatus including an artificial horizon or field of vision which shifts or appears to a trainee to shift to give an illusion of movement corresponding to movements of a plane in flight and means for effecting correctional adjustments of controls of a simulated plane for training purposes.

Other objects relate to various features of construction and arrangement of parts which will be apparent from a consideration of the following specification and accompanying drawings wherein, Figure 1 is a broken perspective view of apparatus which is illustrative of the present improvements;

Fig. 2 is a vertical sectional view through a horizon shifting means;

Fig. 3 is a sectional view taken on line 3—3 of Fig. 2;

Fig. 4 is a sectional view taken on line 4—4 of Fig. 2;

Fig. 5 is a top plan view of the structure shown in Fig. 2 but detached from the overhanging support;

Fig. 6 is a rear elevation of the control stick and associated valve operating means;

Fig. 7 is a plan of a rudder control and a lamp operating means and a diagrammatic representation of control means for the operating means;

Fig. 8 is a broken sectional view taken on line 8—8 of Fig. 6;

Fig. 9 is a sectional view, taken on line 9—9 of Fig. 10 of a condition altering control mechanism;

Fig. 10 is a top plan view of the mechanism shown in Fig. 9;

Fig. 11 is a broken vertical sectional view of a modified form of training apparatus;

Fig. 12 is a broken top plan view thereof; and

Fig. 13 is a sectional view taken on line 13—13 of Fig. 11.

In Figure 1 of the drawings wherein an embodiment of the invention is shown for illustrative purposes, 10 indicates generally a stationary trainee station comprising an enclosure simulating an airplane and provided with a seat 11 for the pilot, a control stick 12 and a rudder bar 13. Located forwardly of the station is an arcuate screen 14 forming the field of view of a trainee looking from the station as in normal flight.

Above the station and preferably approximately above the seat 11 is apparatus generally indicated by the numeral 15 for casting on the screen an artificial horizon the position of which on the screen is shifted in conformity with the manipulation of the flight controls in the station to provide a simulation of response of a plane to similar manipulation of controls in actual flight. Hence if a control is operated similarly to a control of an actual plane which would cause the plane to descend or dive (in which instance of actual flight the actual horizon would appear to ascend), in the apparatus of Fig. 1 the horizon will ascend similarly thus simulating actual descent. Likewise operation of a control as for ascent or right or left turn shifts the horizon and field of view and produces effects on the screen which give the illusion of actual movements in those directions.

The means 15 for producing the illusions mentioned comprises a light projecting member in the form of an incandescent lamp 16 which is partially masked, as at 17, such masked portion being interrupted by light transmitting stripes or veins 18 as shown in Fig. 2. When the lamp 16 is in normal vertical position, a shadow is cast upon the screen, the upper horizontal edge of which shadow constitutes an artificial horizon. The purpose of the light emitting portions 18 will be described later.

The member 15 is supported above the trainee station, preferably on approximately the vertical axis of the arcuate screen, by a hollow standard 19 shown as being secured to the enclosure 10. The member 15 comprises a stationary central shaft 20 adjacent the upper end of which is attached a stationary horizontal disc or plate 21. Two movable lower plates 22 and 23 are mounted on the shaft 19, the mountings therefor comprising ball and socket members 24 and 25 which permit the respective discs to be shifted universally out of the normal horizontal planes in which they are shown in Fig. 1.

To the lower disc 23 is attached a bracket 26 provided with a bearing structure 27 for rotatably supporting a socket 28 for the lamp 16. The lamp can be rotated by a motor 29 which operates a belt 30 trained around a pulley 31 attached to or forming a part of the rotary socket structure. Diametrically opposite the motor 29 a counter balance 32 is provided to compensate for the unbalancing tendency of the motor.

Means are provided for tilting the disc 23 from the normal horizontal position, thereby tilting the lamp and thus shifting the position or location of the simulated horizon upon the screen. The means illustrated comprises a plurality of air cylinder-piston devices, four of the same being employed. The cylinders are designated by the numerals 33 with exponents $a$, $b$, $c$ and $d$ for particularization and the corresponding pistons by characters $34^a$, $34^b$, $34^c$ and $34^d$. The cylinders are attached to the disc 22, spaced 90 degrees of arc apart, while the pistons have connecting rods 35 which through universal joints 36 are connected to the disc 23. Hence downward movement of any one of the pistons shifts the disc 23 and the lamp 16 angularly about the ball joint 25. It will be noted that the cylinders are provided with small air bleeder ports 37 which permit escape of air from the cylinders when the pistons therein move upwardly, and incidentally also permit air to escape on a power stroke but not sufficiently to preclude the shifting of the disc and lamp which preferably is rather gradually moved whereby the extent of movement can be observed (upon the screen) and thereby controlled by the trainee.

A similar set of cylinder-piston devices is located between the discs 21 and 22 for operating the latter, such cylinders being identified by reference characters $38^a$, $38^b$, $38^c$ and $38^d$, and the pistons by characters $39^a$, $39^b$, $39^c$ and $39^d$. The piston rods 40 are connected to the disc 22 through universal joints 41 to provide the flexibility required in tilting the disc 22 about the socket 25.

For operating the pistons compressed air from a tank 42 is employed, the required pressure being maintained by a conventional motor-compressor unit 43 shown in Fig. 1. A duct 44 extends from the tank 42 and connected to it are four branch ducts $45^a$—$45^d$ each connected to a valve operable selectively by the control stick 12 (see Figs. 1 and 6). The valves are indicated by the numerals 46 with the exponents $a$, $b$, $c$ and $d$ for the purpose of particularization. The valves 46 are provided with operating levers 47 each provided with a spring 48 normally holding the valve in closed position as shown in Fig. 6. In the closed position of a valve a duct 46' is out of registration with the respective air conduit 45 as well as out of registration wtih the intake end of an air conduit by means of which air is conducted to one of the cylinders 33 for energizing the piston therein during the power stroke thereof. The air conduits referred to are indicated by the numerals 49 with the exponents $a$, $b$, $c$ or $d$ corresponding to the exponents of the related valves 46 and cylinders 33. Thus, when a valve such as valve $46^a$ is moved to open position, air is delivered from the pressure tank 42 to the piston $33^a$ through duct $45^a$ and $49^a$.

For operating the valves sliding rods 50 are provided each having an enlarged end 51 located adjacent the stick 12 which is universally mounted in any suitable manner whereby any one or two adjacent members 51 can be engaged by a member $12^a$ on the stick and shifted to open the corresponding valves 46 the desired extent. The ducts 49, which may be flexible, are shown extending through the hollow standard 19 into communication with passages 52 within the vertical support 20 communicating with which are flexible conduits 53 each leading to one of the cylinders 33.

In use of the apparatus above described a trainee on the seat 11 operates the stick 12 as in an actual plane to open the selected valve or valves 46 and thereby energize the corresponding piston 34 for shifting the lamp support 23 and thereby the lamp 16 for causing the artificial horizon to shift upon the screen. For example, if the trainee moves the stick rearwardly to open the valve $46a$ (located forwardly of the stick), which movement of the stick in an actual plane will operate the controls to cause the plane to increase its elevation, (thereby apparently causing the actual horizon to descend) the piston $34^a$ will be energized, thereby tilting the lamp 16 rearwardly and causing the artificial horizon on the screen 14 to descend and produce the illusion of actual ascent of the training apparatus. If the pilot pushes the stick 12 forwardly, the valve $46^b$ will be operated and piston $34^b$ will be energized thus tilting the disc 23 about the ball joint 24—25 and causing the lamp 16 to tilt forwardly and the artificial horizon to rise on the screen, thus giving the illusion of actual descent of the plane.

If the trainee pushes the stick to the right to open valve $46^c$, the piston $34^c$ in cylinder $33^c$ will be energized and the lamp will be tilted to the right thus tilting the horizon counter clockwise on the screen to give an illusion of actual banking to the right. Likewise if he pushes the stick to the left, the piston $34^d$ in cylinder $33^d$ will be energized and the lamp will be tilted to the left, thereby tilting the artificial horizon clockwise upon the screen and giving an illusion of banking to the left.

The stick can of course be operated to operate the front or rear valve $46^a$, $46^b$ and simultaneously one of the control valves $46^c$, $46^d$ to produce the illusion of ascent or descent and simultaneously a right or left turn. This combined effect can be produced by reason of the fact that the rectangular member $12^a$ of the stick, when operated forwardly or rearwardly can still be shifted laterally for engaging one or the other of the lateral members 51 of the valve operating rods 50.

When it is desired to turn a plane in actual flight to the right or left, not only is it necessary to operate the stick in the proper direction but also the rudder bar, thus causing the plane to bank in the direction of turn. In turning to the right in actual flight, the horizon apparently moves to the left and vice versa. Hence in the training apparatus illustrated the lamp is arranged to be rotated in either direction by the reversible motor 29 under control of the trainee. For the purpose of producing the illusion of the horizon or landscape moving to the right or left upon a simulated left or right bank, respectively, of the apparatus, the shaded portion 17 of the lamp is provided with the light emitting veins or stripes 18 which during rotation of the lamp in one direction or the other produce an illusion of a shifting horizon and landscape.

For controlling the operation of the reversible motor 29, the rudder 13 is employed. As shown in Fig. 7, rheostats 54 and 55 are arranged in the motor circuit and a switch blade 56 is arranged to move successively over contacts 57 or 58, depending on the direction of operation of the rudder bar, for cutting out resistance in the circuit and thereby controlling the speed of rotation of the motor. Hence as viewed in Fig. 7, pushing the right end of the bar 13 forwardly will first close the motor circuit with all the resistance elements in the circuit. The motor will operate in a direction to rotate the lamp 16 slowly to the left (or clockwise looking at the lamp from below), thereby producing a left-wise shifting of the artificial horizon and landscape on the screen to give an illusion of a right turn by reason of the pushing of the rudder bar forwardly with the right foot. Pushing the bar 13 further with the right foot cuts out resistance of the closed motor circuit and hence increases the rate of rotation and hence gives the illusion to the trainee of a sharper right turn of the apparatus. If the trainee pushes the left end of the rudder bar, the motor will of course rotate the lamp in the opposite direction to produce the illusion of a left turn.

The illusion of right and left turns may be combined with the illusion of right or left banking of the apparatus by operating the rudder bar in one direction or the other and the stick in a correlative direction to produce a tilting of the artificial horizon upon the screen as will be understood.

By means of the apparatus above described, it will be apparent that a trainee can practice operation of the stick and rudder bar and observe on the screen the results of such operations which simulate the results produced by such operations in a plane in actual flight. Horizon lines cast by the lamp, such as are indicated at H, H$^a$, H$^b$ are indicated on the screen in Fig. 1 in simulation of an actual horizon observed by a pilot in actual flight. The indicated horizon lines correspond merely to only three of the many positions which the lamp may assume, as will be understood, since the horizon can be tilted either to the right or left at various angles, corresponding to the operation of the stick to the left or right, respectively, or raised or lowered above or below the horizontal position H by tilting the stick rearwardly or forwardly, respectively. Combinations of tilting and elevation of the horizon are produced by operating the stick in appropriate manner as explained above.

For the purpose of giving the trainee experience in restoring a plane to or maintaining a plane in a selected course under conditions which would tend to throw a plane in actual flight from such course, the supporting disc 22 is also made adjustable as explained above. Cylinders 38$^a$—38$^d$ are operatively secured to the disc 21 for shifting the disc in the manner above described with reference to disc 23. When disc 22 is tilted or shifted by any one or more of the pistons 39, the disc 23 as well as the lamp are similarly, or tend to be similarly, shifted. Air under pressure for operating the pistons 39 is supplied from a tank, such as tank 42, by four ducts 62 (see Fig. 1) which extend from the tank to a control device indicated generally by the numeral 63. Device 63 comprises cam operable sliding valves 64, the exponents $a$ to $d$ identifying the valves with the respective cylinders 38 having similar exponents. The valves 64 are slidable from a valve closing position against the action of springs 65 to valve opening position each for permitting air under pressure to flow from the respective duct 62 to a duct 66 which ducts extend through the standard 19 and communicate with passages 67 in the support 20, which passages communicate with conduits 68 leading to the cylinders 38. Cams 69, 70 are arranged each for operating alternately two of the valves 64 as shown in Fig. 9, each cam being operable by a variable speed motor 71, 72, respectively. The motors are provided with rheostats 73, 74 whereby their rate of rotation can be independently controlled, it being understood that suitable speed reducing mechanism (not shown) may be provided to reduce the maximum rate of rotation of the cams to that desired.

An instructor can operate the rheostats 73, 74 to effect operation of the pistons 39 in a desired sequence or in a random manner for causing the lamp 16 to be shifted in like manner, thereby producing a shifting of the artificial horizon in simulation of a plane flying under conditions tending to produce changes in the course of the plane. A trainee, under such conditions, operates the stick and rudder bar to reduce or overcome the effects produced by the motors 71 and 72 in simulation of a pilot in actual flight encountering conditions which affect the flight of his plane. The operation of the motors 71 and 72 may be controllable by an instructor who can observe the reaction or correctional response of the trainee to the changes caused by the motors 71, 72 or one of them. In other words if a trainee is attempting to maintain the simulated plane in a horizontal course, the motors 71, 72 effect a shifting of the artificial horizon and the trainee must operate the controls to restore the horizon to horizontal position. Thus practice is obtained in restoring a plane to its selected course when deflected therefrom by the means described.

In Figs. 11 to 12 of the drawings a modified form of training apparatus is disclosed, embodying mechanism similar to the cylinder-piston construction above described and which is employed for actually shifting the positions of the trainee rather than merely producing illusions of such shifting.

In Fig. 11 a trainee seat is indicated at 75 supported by any suitable means on a shiftable or tiltable support 76 which is mounted by universal means 77 on a vertical rotary standard 78. Secured to the standard 78 is a horizontal support 79 which is provided with four sleeves 80 (two only being shown in Fig. 11) within which are positioned slidable air cylinders 81. A second lower horizontal support 82 is secured to the standard 78 and to it are secured four cylinders 83 (two only being shown in Fig. 11).

Secured to the tiltable support 76 is an air valve mechanism 84 operable by a control stick 85 whereby a trainee on the seat 75 can by manipulation of the stick operate the valve mechanism for effecting tilting of the support 76 and the seat in a selected manner in simulation of the positions of a plane in flight, in landing or on the take-off.

The mechanism 84 comprises four valve casings 86 within each of which is a slidable valve 87 operable by the stick against a spring 88. Tubes or conduits 89 direct air from a source under pressure to the casings 86 and when a valve 87 has been shifted by the stick 85 to such outer position that an annular passage 87ª in the valve registers with the inlet of the respective conduit 89 and the inlet of a conduit 90 leading to a cylinder 81, a piston 91 in the cylinder will be actuated and by means of a connecting rod 92 connected to the support 76, the latter will be tilted upon its universal mounting. During periods when air is flowing to a cylinder, the exhaust port or duct 93 of the valve is closed by the valve body but the valve diametrically opposed to the open valve will have been moved by its spring to the position wherein the valve passage 87ª thereof registers with the exhaust 93 to permit the air in said opposed cylinder to be exhausted freely as the piston therein descends by reason of the tilting of the support 76. Hence as a piston in any cylinder is forced upwardly by the air admitted to the cylinder, due to the opening of the corresponding valve upon the operation of the stick 85, the spring 88 of the valve controlling the opposed cylinder shifts the latter valve to exhausting position to avoid trapping air in said opposed cylinder.

With the apparatus shown in Fig. 11, a trainee can operate the stick for effecting the shifting or tilting of the seat in simulation of the tilting movement of a plane in response to similar movements of the stick thereof in actual flight.

For the purpose of causing the support 76 to shift under the influence of means beyond the control of the trainee for the purpose of affording practice in restoring a plane to or maintaining it upon a selected course, trainer controlled mechanism is provided. Such mechanism comprises, in the apparatus illustrated, the four cylinders 83 each having a piston 94 therein connected by a piston rod 95 with the superjacent slidable cylinder 81. When air is admitted to any of the cylinders 83, its piston 94 is forced upwardly thereby elevating the connected cylinder 81 and if the controlling valve 87 of that cylinder 81 is closed, the piston 91 in such cylinder 81 will be forced upwardly to cause the support 76 to tilt. To correct such tilting, the trainee operates the stick in the proper direction to energize the piston of the opposed cylinder 81 which simultaneously causes the control valve 87 of the first mentioned cylinder 81 to be opened and thereby restores the member 76 to the horizontal or other desired position.

It will be seen therefore that an instructor or trainer upon energizing any of the pistons 94 can cause the support 76 to be tilted for the purpose of observing the response of the trainee to such movement of his simulated plane and his efforts to restore it to its former or selected position.

Means under the control of an instructor for moving the plane or member 76 from its position as described comprises motor operated valve members 96, of similar construction and each arranged to control the operation of the pistons of two diametrically opposed cylinders 83. Each valve mechanism 96 comprises a casing 97 and a sliding valve member 98 operable against a spring 99 by a cam 100 operable by a variable speed motor 101 controllable by a rheostat 102 or the like operable by an instructor. Upon operation of a motor 101 the cam 100 thereof forces the valve 98 inwardly of the casing and shifts the position of the air passages 103, 104 thereof from the position shown in Fig. 11 to a second operable position. In Fig. 11 the valve 98 is shown in the position wherein the passage 103 registers with an air intake conduit 105 and the conduit 106 which conducts air to the left hand cylinder 83. The other passage 104 registers with an exhaust port 107 in the casing 97 and also with an exhaust conduit 108 extending from the right hand cylinder 83 of Fig. 11. If air under pressure were flowing through the conduit 105, the piston 94 of the left hand cylinder 83 would be elevated and air from the right hand cylinder would be exhausted through conduit 108, passage 104 and exhaust port 109. If the cam 100 were rotated 180 degrees, the passage 103 would register with intake 109 while passage 104 would register with exhaust port 110. Hence air under pressure could flow through passage 103 from line 109 into the conduit 111 which leads to the right hand cylinder 83 shown in Fig. 11 to tilt the member 76 counterclockwise. Air from the left hand cylinder 83 would be exhausted through conduit 112, passage 104 and exhaust port 110. Operation of the cam 100 therefore will alternately effect the tilting of the member 76 in opposite directions as will be observed. Operation of the other valve mechanism which is operatively connected by air conduits and exhaust ducts with the other two opposed cylinders 83 will effect tilting of the member 76 in a plane at right angles to the direction of movement imparted to the member 76 by the mechanism just above described. A motor 101' is shown in Fig. 11 which is controlled by an instructor for operating a cam 100' for shifting the valve mechanism 96', portions of which are given primed reference characters corresponding to the valve mechanism 96 above described.

It will be observed that with the modified form of training apparatus shown in Figs. 11 to 13, the trainee can practice operation of the stick with or without the disturbing effects produced by the instructor operable mechanism. In the modified construction a screen 112 may be provided with a fixed horizon line 113 whereby the actual angular shifting of the apparatus can be gauged.

For the purpose of actually rotating the trainee station shown in Fig. 11, as in making a right or left turn, the vertical support 78 is rotatably supported in a base 114, and suitable means are provided for rotating the support in one direction or the other under the control of the trainee. The means shown for illustrative purposes comprises a reversible motor 115 mounted on the base 114 for operating a belt 116 trained around a pulley 117 secured to the rotatable support 78. The motor circuit is not illustrated in Fig. 11 but may correspond to that shown in Fig. 7 whereby operation of the rudder bar in one direction or the other will effect arcuate movement of the support 78 in one direction or the other for producing actual turning movement of the trainee station. Any suitable speed reduction mechanism may be employed between the motor 115 and the belt 116 as will be appreciated.

While I have shown and described certain embodiments of the invention for illustrative purposes, it will be apparent that various alterations may be made therein and various other uses may be made of the novel shifting apparatus without departing from the spirit of the invention.

I claim:

1. Aircraft pilot training apparatus comprising a stationary trainee station, a screen located forwardly thereof, adjustable means for projecting light upon the screen to produce thereon a simulated horizon, means having control means remote from the trainee station for shifting said projecting means for altering the angular disposition and elevation of said horizon to simulate changes in position of the station, and manual control means for said projecting means simulating aircraft steering means operable by a trainee in said station simultaneously with and in opposition to the operation of said first mentioned control means for correctively adjusting said projecting means to effect restoration of said horizon to a selected position.

2. Aircraft pilot training apparatus comprising a stationary trainee station, a screen forwardly thereof, adjustable means for projecting light upon the screen to produce thereon a simulated horizon, means beyond the control of the trainee for shifting said projecting means to create an illusory change in position of the station, and pneumatically operable means for said projecting means provided with controls simulating aircraft steering means operable by a trainee in said station simultaneously with and in opposition to the operation of said first mentioned means for shifting said projecting means, for correctively adjusting the position of said projecting means for restoring the horizon to a selected position.

3. Aircraft pilot control apparatus comprising a trainee station, a screen located forwardly thereof, a vertical standard above said station, a pair of normally horizontally disposed supports centrally attached to said standard one above the other for independent universal movement from the horizontal, a group of actuating devices secured to the upper of said supports and operatively attached to the lower support for effecting angular adjustment of the latter, a source of light carried by said lower support for projecting light upon said screen to provide thereon an artificial horizon movable in accordance with the angular movements of said lower support, a second group of actuating devices above said upper support and operatively attached thereto for effecting angular shifting movement thereof and also corresponding movement of said lower support through the instrumentality of said first mentioned actuating devices, automatic means for effecting the energization of said second group of devices, and means simulating aircraft steering means operable by a trainee in said station for effecting the selective energization of said first group of devices for correctionally adjusting the movement of said light source to cause said horizon to move to or remain in a given position upon said screen.

4. Aircraft pilot training apparatus comprising a stationary trainee station, a screen located forwardly thereof, a source of light arranged to project light upon the screen to produce thereon a simulated horizon, a centrally supported horizontal universally mounted support for said light, a plurality of spaced air operable members operatively attached to said support for shifting the same angularly to the horizontal for shifting said light source for altering the position of the horizon upon the screen, a source of compressed air for said operable members, valves for controlling the flow of air from said air source to said members, control means remote from the trainee station for operating certain of said valves for effecting the selected shifting of said horizon, and control means simulating an airplane control stick and operable by a trainee in said station for operating certain other of said valves for simultaneously and in opposition to the operation of said first mentioned control means correctively adjusting said source of light to effect restoration of said horizon to a selected position.

5. Apparatus for training airplane pilots, comprising a trainee station, a screen located forwardly thereof, a partially masked source of light for directing light upon the screen to cast thereon an artificial horizon, means universally adjustably supporting said light source, a plurality of activating devices for said supporting means, control means remote from the trainee station for operating certain of said activating devices for effecting the selected shifting of said horizon, and control means simulating an airplane control stick in said station operable by the trainee for operating certain other of said activating devices for simultaneously and in opposition to the operation of said first mentioned control means correctively adjusting said source of light to effect restoration of said horizon to a selected position.

6. Aircraft pilot training apparatus comprising a stationary trainee station, a screen located forwardly thereof, a partially masked angularly adjustable and rotatable lamp for projecting light upon the screen to define a horizon, means having control means remote from the trainee station for shifting said lamp for altering the angular disposition and elevation of said horizon to simulate changes in position of the station, manual control means for said lamp simulating an airplane control stick operable by a trainee in said station simultaneously with and in opposition to the operation of said first mentioned control means for correctively adjusting said lamp to effect restoration of said horizon to a selected position, a simulated aircraft rudder bar operable by the trainee, rotary operating means for rotating said lamp in either direction, and means operable by said bar for controlling the speed and direction of movement of said rotary operating means for producing selected rotary movement of the lamp and illusory rotary movement of said station with respect to the horizon upon the screen.

SAM KANTER.